(12) United States Patent
Park (10) Patent No.: US 11,796,355 B2
(45) Date of Patent: Oct. 24, 2023

(54) DEVICE FOR FIXING MEASURING INSTRUMENT FOR INSPECTING DISPLAY

(71) Applicants: SP TECHNOLOGY CO., LTD., Anyang-si (KR); Yong Jin Park, Uiwang-si (KR)

(72) Inventor: Yong Jin Park, Uiwang-si (KR)

(73) Assignees: SP TECHNOLOGY CO., LTD.; Yong Jin Park

( * ) Notice: Subject to any disclaimer, the term of this patent is extended or adjusted under 35 U.S.C. 154(b) by 44 days.

(21) Appl. No.: 17/580,818

(22) Filed: Jan. 21, 2022

(65) Prior Publication Data

US 2022/0146289 A1 May 12, 2022

Related U.S. Application Data

(63) Continuation of application No. PCT/KR2020/011515, filed on Aug. 28, 2020.

(30) Foreign Application Priority Data

Sep. 5, 2019 (KR) .................. 10-2019-0109908

(51) Int. Cl.
  *G01D 11/30* (2006.01)
  *A47B 97/00* (2006.01)
  *F16M 11/04* (2006.01)
(52) U.S. Cl.
  CPC .............. *G01D 11/30* (2013.01); *A47B 97/00* (2013.01); *F16M 11/046* (2013.01); *A47B 2097/005* (2013.01)

(58) Field of Classification Search
  CPC ... G01D 11/30; A47B 97/00; A47B 2097/005; F16M 11/046; F16M 11/043; F16M 13/00
  USPC ...................................... 248/295.11, 542, 544
  See application file for complete search history.

(56) References Cited

U.S. PATENT DOCUMENTS

| | | | | |
|---|---|---|---|---|
| 9,185,818 B2* | 11/2015 | Lee | ........................... | H04N 5/64 |
| 9,215,981 B2* | 12/2015 | Pan | ......................... | G03B 17/00 |
| 2022/0024605 A1* | 1/2022 | Sirmans | .................... | B64F 5/40 |

FOREIGN PATENT DOCUMENTS

| | | |
|---|---|---|
| KR | 10-2004-0080469 A | 9/2004 |
| KR | 10-2004-0105085 A | 12/2004 |
| KR | 10-2010-0025305 A | 3/2010 |
| KR | 10-2012-0049166 A | 5/2012 |
| KR | 10-2013-0079164 A | 7/2013 |
| KR | 10-1937747 B1 | 1/2019 |

OTHER PUBLICATIONS

International Search Report (PCT/KR2020/011515), WIPO, dated Dec. 3, 2020.

\* cited by examiner

*Primary Examiner* — Anita M King
(74) *Attorney, Agent, or Firm* — Park & Associates IP Law Office (57) ABSTRACT

A device for fixing a measuring instrument for inspecting a display includes a fixed frame unit detachably mounted on the top end of a display, a moving frame extending upward and downward and mounted to be liftable on the fixed frame unit, and an elevating unit which is mounted to be liftable on the moving frame and on which a measuring instrument for inspecting a display is detachably mounted.

5 Claims, 8 Drawing Sheets

DEVICE FOR FIXING MEASURING INSTRUMENT FOR INSPECTING DISPLAY

REFERENCE TO RELATED APPLICATIONS

This is a continuation of pending International Patent Application PCT/KR2020/011515 filed on Aug. 28, 2020, which designates the United States and claims priority of Korean Patent Application No. 10-2019-0109908 filed on Sep. 5, 2019, the entire contents of which are incorporated herein by reference.

FIELD OF THE INVENTION

The present disclosure relates generally to a device for fixing a measuring instrument for inspecting a display. In detail, the present disclosure relates to generally to a device for fixing a measuring instrument for inspecting a display, wherein the device is configured to be removably mounted to the display and to allow a part of the device to be raised and lowered, and to adjust a mounting height of the measuring instrument as the device is raised and lowered, so that an inspection position of the display using the measuring instrument is adjustable.

BACKGROUND OF THE INVENTION

Visual quality inspection is required for not only functional quality satisfaction, but also emotional quality satisfaction for display products such as TVs and monitors.

Visual quality may include defects in picture quality, defects such as lines or dots appearing on the screen, clarity of colors, sharpness of pictures or characters, eye fatigue, and uniformity of color luminance and chromaticity.

In order to perform the visual quality inspection, the brightness, luminance, chromaticity, color temperature, etc. of a display are inspected, and various measuring instruments that can measure the inspecting elements are used.

As the measuring instrument, a luminance meter, a color difference meter, etc. are used. A screen of the display is captured using the measuring instrument, and the captured image is converted to a digital signal, and then the signal is transmitted to a microcomputer that determines the quality of the captured image, and the microcomputer determines the quality of the display.

In general, as a method of inspecting the visual quality of the display using the measuring instrument, a method of performing an inspection by an inspector holding the measuring instrument and pointing an imaging part of the measuring instrument toward an inspection position of the display, and a method of performing an inspection by an inspector mounting the measuring instrument to a tripod and pointing the imaging part of the measuring instrument toward the inspection position of the display are used.

As a related art, Korean Patent Application Publication No. 10-2004-0105085 disclosed a chromaticity inspection system for inspecting the visual quality of the display by capturing the screen of the display by using the measuring instrument. Furthermore, a method of inspecting a display by mounting the measuring instrument to the tripod and capturing the display is disclosed on drawings.

However, when the inspector holds the measuring instrument and performs inspection, there is a problem in that great inconvenience occurs in the inspection, and a large deviation may occur in the inspection result due to shaking. Furthermore, there is a problem in that it is difficult to perform stable inspection because of the wide variation in inspection conditions such as a distance between the measuring instrument and the display is changed for each inspection.

Furthermore, even when inspection is performed by mounting the measuring instrument to the tripod, it is difficult to maintain a position of the tripod constant for each inspection thus increasing the variation in inspection conditions, such as the distance between the measuring instrument and the display varies, so that it is difficult to perform a stable inspection. Furthermore, there is a limit to adjusting a height of the measuring instrument in response to a change in a position where the display to be inspected is placed or a change in the size of the display.

SUMMARY OF THE INVENTION

Accordingly, the present disclosure has been made keeping in mind the above problems occurring in the prior art, and an objective of the present disclosure is intended to provide a device for fixing a measuring instrument for inspecting a display, wherein the device is configured to be removably mounted to the display, and to fix the measuring instrument so that the measuring instrument faces an inspection position of the display.

Another objective of the present disclosure is intended to provide a device for fixing a measuring instrument for inspecting a display, wherein the device is configured to maintain a distance between the measuring instrument and the display constant.

A further objective of the present disclosure is intended to provide a device for fixing a measuring instrument for inspecting a display, wherein the device is configured to adjust a mounting height of the measuring instrument for inspecting the display to adjust an inspection position of the display, and to perform inspection corresponding to the various sizes of the display.

According to an embodiment of the present disclosure, a device for fixing a measuring instrument for inspecting a display includes: a fixed frame unit configured to be removably mounted to an upper end of the display; a moving frame extended in vertical directions and configured to be movably mounted to the fixed frame unit in a raisable and lowerable manner; and an elevating unit configured to be mounted to the moving frame in the raisable and lowerable manner and configured to removably hold the measuring instrument for inspecting the display.

The moving frame may have a pair of guide slits that may penetrate the moving frame in shapes spaced from each other in a transversal direction and be extended the vertical directions, and the fixed frame unit may include: a fixed frame configured to be mounted to the upper end of the display; and an elevating guide arranged at front of the pair of guide slits of the moving frame while crossing between the guide slits, the elevating guide having opposite ends protruding rearward and passing through the pair of guide slits and fixed to the fixed frame, thereby restraining the moving frame in the raisable and lowerable manner.

The moving frame may have a plurality of fixing part inserting holes arranged at an region between the pair of guide slits with vertical intervals, and the fixed frame unit may include a fixing part, wherein the fixing part may be configured to be movable in a direction insertable in and ejectable from one of the fixing part inserting holes located at a height corresponding to a height of the elevating guide, and to selectively fix the moving frame at a user-desired height while being inserted into the fixing part inserting hole located at the corresponding height as the user manipulates the fixing part.

The moving frame may have an elevating unit mounting part extended in the vertical directions, the elevating unit mounting part penetrating the moving frame, and the elevating unit may include: an elevating part provided at the moving frame and configured to be movable in a raisable and lowerable manner along the elevating unit mounting part; and a measuring instrument mounting part protruding forward from the elevating part and configured to hold the measuring instrument, wherein the elevating unit mounting part may be configured to expose the display toward the measuring instrument.

The measuring instrument mounting part may have a measuring instrument seating part protruding forward from an upper end of the elevating part and providing a seating surface of the measuring instrument; and a pair of measuring instrument fixing ribs protruding from an upper surface of the measuring instrument seating part so as to surround opposite sides of the measuring instrument, and arranged in the transversal direction with an interval.

According to the embodiment of the present disclosure, the device for fixing a measuring instrument for inspecting a display may have the following effects.

First, the device for fixing a measuring instrument for inspecting a display includes the fixed frame unit removably mounted to the upper end of the display, the moving frame mounted to the fixed frame unit in the raisable and lowerable manner, and the elevating unit mounted to the moving frame and to which the measuring instrument is removably mounted.

With the characteristic of the above structure, the measuring instrument fixing device is fixed to the upper end of the display, so that the measuring instrument can be fixed while maintaining a distance between the measuring instrument and the display constant for each inspection regardless of a position where the display is placed. Therefore, inspection for the display can be efficiently and stably performed.

Furthermore, since the fixed frame unit is removably mounted to the display, a mounting position of the fixed frame unit is moved transversally along the upper end of the display, so that a position of the measuring instrument can be adjusted transversally. Furthermore, since the moving frame is raisable and lowerable, a position of the measuring instrument can be adjusted vertically by raising and lowering. Therefore, an inspection position can be changed vertically and transversally while a distance between the measuring instrument and the display is maintained constant, so that further efficient and flexible inspection can be performed.

Second, the elevating unit to which the measuring instrument is mounted can be mounted to the moving frame in the raisable and lowerable manner. Therefore, through raising and lowering of the elevating unit in addition to raising and lowering of the moving frame, a vertical adjustable range of the measuring instrument can be secured further wider, thereby efficiently corresponding to a size variation of the display and performing efficient and flexible inspection.

Third, the pair of guide slits is formed on the moving frame by penetrating the moving frame while transversally being spaced apart from each other, and the fixed frame unit includes the fixed frame mounted to the upper end of the display, and the elevating guide arranged at the front of the moving frame and crossing between the pair of guide slits of the moving frame and opposite ends of the elevating guide protrude rearward and are fixed to the fixed frame by passing through the pair of guide slits.

With the characteristic of the above structure, the moving frame can be fixed to the fixed frame unit in the raisable and lowerable manner by the elevating guide. Furthermore, the opposite ends of the elevating guide pass through the pair of guide slits, so that the moving frame can be prevented from being tilted transversally. Furthermore, when the moving frame is raised and lowered, the opposite ends of the elevating guide are moved along the pair of guide slits, so that raised and lowered movements of the moving frame can be smoothly performed.

Fourth, the moving frame has the plurality of fixing part inserting holes vertically spaced apart from each other at the region between the pair of guide slits, and the fixed frame unit includes the fixing part, the fixing part being provided to be movable in an insertable and ejectable direction with respect to one of the fixing part inserting holes located at a height corresponding to the elevating guide and being selectively inserted into the fixing part inserting hole located at the corresponding height by manipulation of the user.

With the characteristic of the above structure, the user can manipulate the fixing part to release the fixed state of the moving frame to raise and lower the moving frame, and the user can insert the fixing part into the fixing part inserting hole located at the corresponding height while the moving frame is located at the desired height, so that the moving frame can be fixed without vertical movement. In other words, the moving frame can be changed into the raisable and lowerable state and the fixed state by simple movement manipulation of the fixing part, whereby the usability can be improved.

Fifth, the elevating unit mounting part is formed by penetrating the moving frame while being extended vertically, and the elevating unit includes the elevating part provided in the moving frame to be raisable and lowerable along the elevating unit mounting part, and the measuring instrument mounting part protruding from the elevating part and to which the measuring instrument is mounted.

With the characteristic of the above structure, as the elevating unit is provided at the elevating unit mounting part formed by penetrating the moving frame in the raisable and lowerable manner, it is possible to capture a screen of the display exposed through the elevating unit mounting part by using the measuring instrument mounted to the elevating unit. In other words, the measuring instrument can capture the display by using the elevating unit mounting part. Therefore, the elevating unit is arranged at the center of the moving frame in the raisable and lowerable manner, so that the center of gravity can be arranged not to be unilateral, and the screen of the display can be captured by the measuring instrument mounted to the elevating unit.

DETAILED DESCRIPTION OF THE INVENTION

Hereinafter, an exemplary embodiment of the present disclosure will be described in detail with reference to accompanying drawings.

However, the spirit of the present disclosure is not limited to the presented embodiment, and by addition, modification, and removal of another component, other embodiments included within other degenerative inventions or the scope of the spirit of the present disclosure may be easily proposed.

Figure 1:
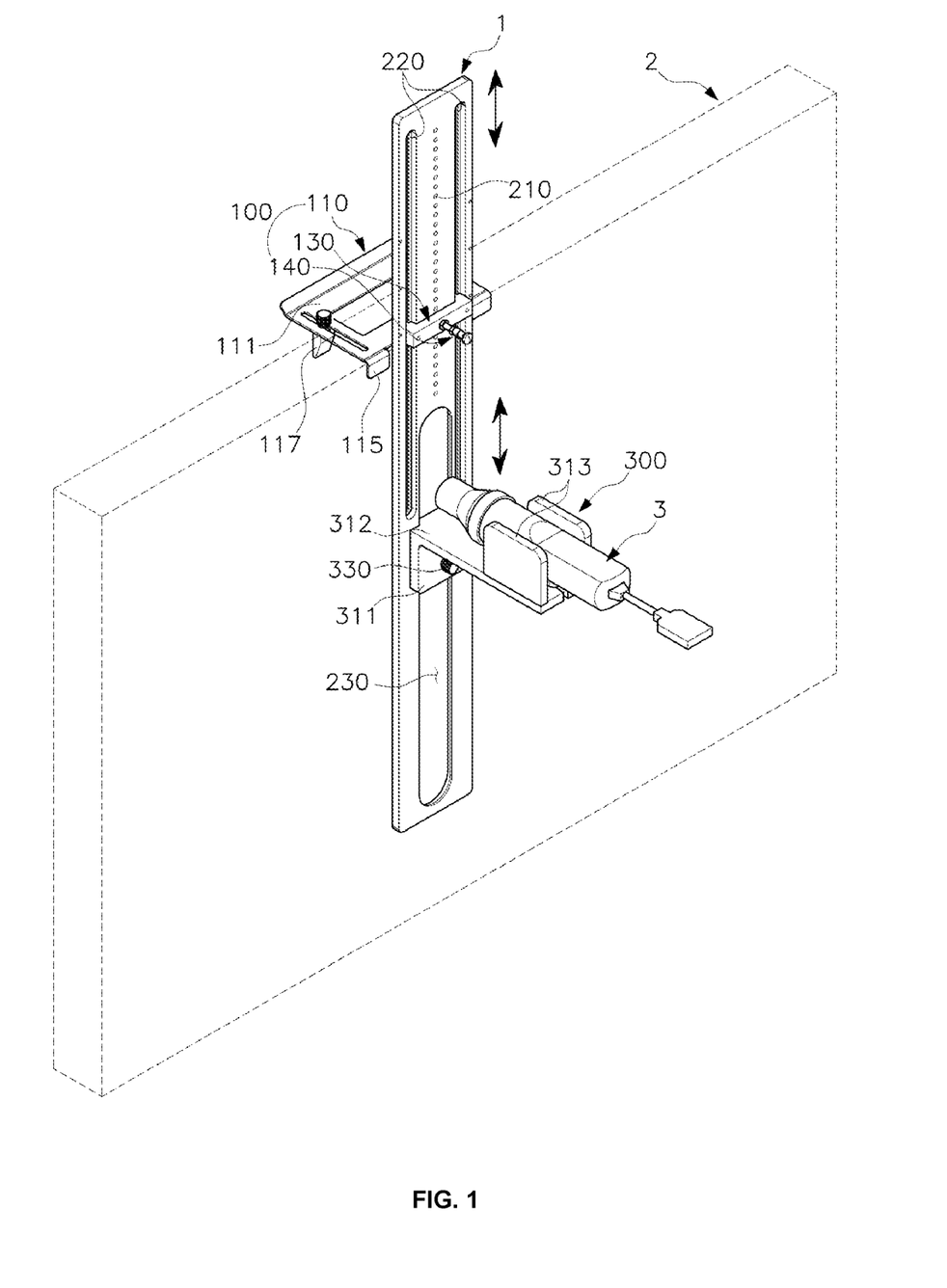
FIG. 1 is a perspective view showing a fixing device according to an embodiment of the present disclosure, wherein the fixing device is configured to hold a measuring instrument for inspecting a display.
Figure 2:
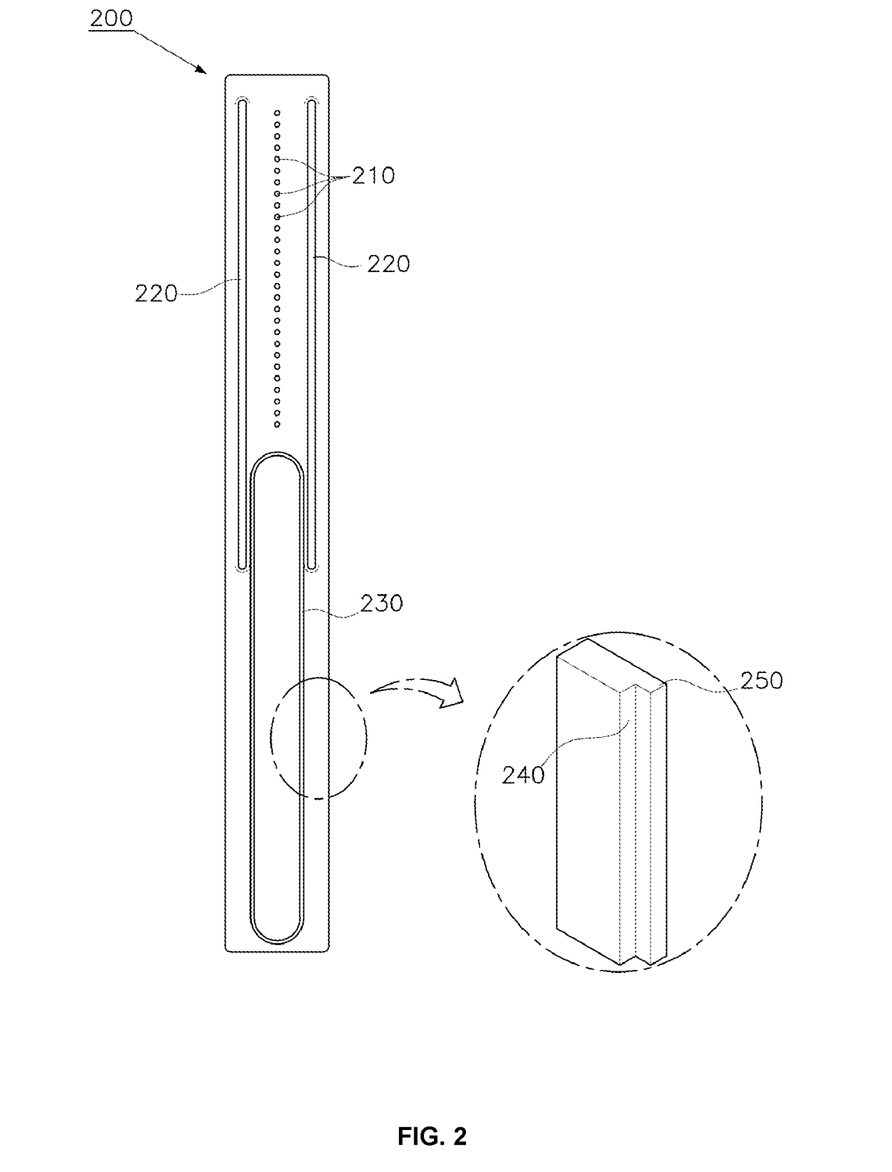
FIG. 2 is a front view showing a moving frame according to the embodiment of the present disclosure.
Figure 3:
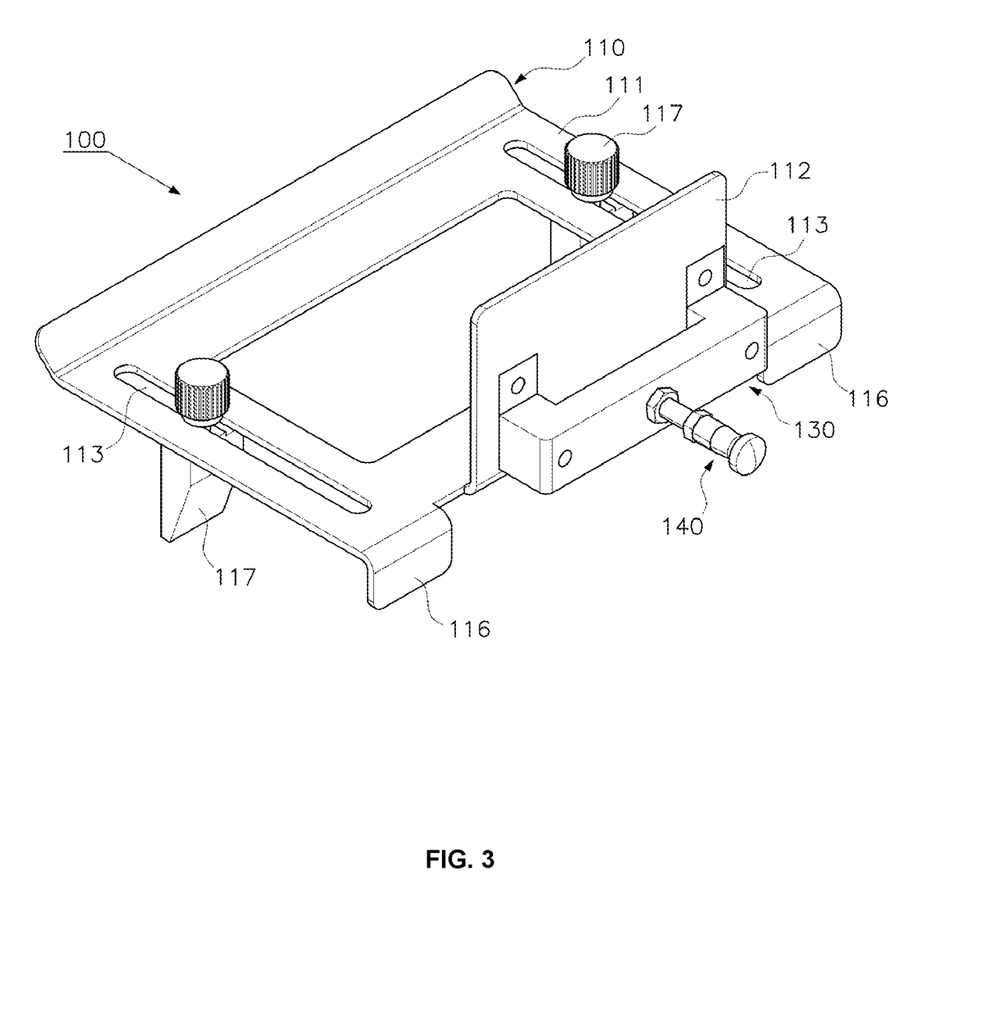
FIG. 3 is a perspective view showing a fixed frame unit according to the embodiment of the present disclosure.

FIG. 1 is a perspective view showing a fixing device according to an embodiment of the present disclosure, wherein the fixing device is configured to hold a measuring instrument for inspecting a display. FIG. 2 is a front view showing a moving frame according to the embodiment of the present disclosure. FIG. 3 is a perspective view showing a fixed frame unit according to the embodiment of the present disclosure.

A measuring instrument 3 for inspecting a display may be a measuring instrument that is able to inspect at least one of performance elements including brightness, luminance, chromaticity, color temperature, etc. of the display to be tested.

For example, the measuring instrument 3 may be a luminance meter and a color difference meter. As an example, a product such as 'CA-310', 'CA-410', etc. may be applied as the luminance meter, and a product such as 'CM-H50', 'CM-H600', etc. may be applied as the color difference meter.

In order to inspect the performance of the display 2 by using the measuring instrument 3, the measuring instrument 3 should aim at an inspection position of the display 2 for a predetermined time. Then, in order to achieve uniform inspection, it is necessary to maintain a distance between the measuring instrument 3 and the display 2 constant.

According to the embodiment of the present disclosure, a device 1 for fixing the measuring instrument for inspecting a display may include a fixed frame unit 100 removably mounted to an upper end of the display 2.

As the fixed frame unit 100 is provided to be removably mounted to the upper end of the display, an inspection position of the display 2 by using the measuring instrument 3 may be changed in a transversal direction. Therefore, the inspection position of the display 2 may be flexibly changed the transversal direction, and it is possible to flexibly respond with the inspection of variously sized displays 2.

The fixing device 1 (hereinafter, the device for fixing the measuring instrument for inspecting a display will be referred to as the fixing device) may include a moving frame 200 mounted to the fixed frame unit 100 in a raisable and lowerable manner. The moving frame 200 may be selectively fixed to the fixed frame unit 100 at a user-desired height.

The fixing device 1 may include an elevating unit 300 mounted to the moving frame 200 in the raisable and lowerable manner, and to which the measuring instrument 3 for inspecting a display is removably mounted. The elevating unit 300 may be selectively fixed to the moving frame 200 at the user-desired height.

As the moving frame 200 is mounted to the fixed frame unit 100 in the raisable and lowerable manner, the inspection position of the display 2 may be vertically changed with raising and lowering of the moving frame 200.

Moreover, as the elevating unit 300 to which the measuring instrument 3 is mounted is mounted to the moving frame 200 in the raisable and lowerable manner, the inspection position of the display 2 may be changed upward and downward with raising and lowering of the elevating unit 300.

Therefore, with raising and lowering of the moving frame 200 and the elevating unit 300, the inspection position of the display 2 may be flexibly changed upward and downward, and it is possible to flexibly respond to inspection of the variously-sized displays 2.

<The Fixed Frame Unit>

In more detail, the fixed frame unit 100 may be removably provided at an upper end of the display 2 to be inspected in a hanging type structure.

The fixed frame unit 100 may include a fixed frame 110 mounted to the upper end of the display 2, and an elevating guide 130 mounting the moving frame 200 to the fixed frame 110 in the raisable and lowerable manner.

The fixed frame 110 may include a seated part 111 formed in an approximately rectangular plate and seated on the upper end of the display 2, and a bent part 112 bent at one side of the seated part 111.

The bent part 112 may be bent upward perpendicular from an upper end of the seated part 111. Then, the bent part 112 may be formed to have a predetermined vertical width and a predetermined transversal width. The bent part 112 may be formed to have the transversal width narrower than a transversal width of the seated part 111. The bent part 112 may be arranged at the center of the transversal width of the seated part 111.

The elevating guide 130 may be mounted to the bent part 112. Then, the bent part 112 may prevent the moving frame 200 from tilting forward and rearward while being in contact with a rear surface of the moving frame 200. The bent part 112 may serve to guide raising and lowering of the moving frame 200.

Of course, the bent part 112 is not limited to the embodiment of the present disclosure, and various structures that may prevent tilting of the moving frame 200 and guide raising and lowering may be applied to the bent part 112. For example, the bent part 112 may be bent downward from the front end of the seated part 111 and protrude downward, and the bent part 112 may be extended upward and downward from the upper end of the seated part 111 and protrude upward and downward.

Meanwhile, the fixed frame 110 may include a plurality of locking protrusions 115 restraining the upper end of the display 2.

The plurality of locking protrusions 115 may protrude downward from a lower surface of the seated part 111, and may be arranged to be spaced apart from each other in front and rear portions of the seated part 111.

The upper end of the display 2 is inserted into a forward and rearward space between the plurality of locking protrusions 115 so that front and rear surfaces of the display 2 may be supported by the plurality of locking protrusions 115.

As the upper end of the display 2 is inserted into the forward and rearward space between the plurality of locking protrusions 115 and restrained, the fixed frame 110 may be mounted to the upper end of the display 2 without movement.

Meanwhile, the plurality of locking protrusions 115 may be configured such that at least a part thereof may be movable so that the forward and rearward space is adjustable.

As an example, the plurality of locking protrusions 115 may include fixed locking protrusions 116 and movable locking protrusions 117.

The fixed locking protrusions 116 may protrude downward front the front end of the seated part 111 of the fixed frame 110. The fixed locking protrusions 116 may be integrally formed with the seated part 111 and may be coupled to the seated part 111 while being separately provided.

The movable locking protrusions 117 may be arranged in rear of the fixed locking protrusions 116 and may be provided to be movable rearward.

In detail, the movable locking protrusions 117 penetrate the seated part 111, and the guide slits 113 for the locking protrusions that can form 2 moving path of the movable locking protrusions 117.

The guide slits 113 for the locking protrusions may be formed by cutting out a part of the seated part 111, and may be extended long forward and rearward from a rear portion of the fixed locking protrusions 116.

The movable locking protrusions 117 may be configured such that lower portions thereof respectively penetrate the guide slits 113 for the locking protrusions and protrude downward from the seated part 111. Then, the movable locking protrusions 117 may be provided to be slidably movable forward and rearward along the guide slits for the locking protrusions.

Then, upper portions of the movable locking protrusions 117 may protrude upward from the seated part 111 so that the user can grip the movable locking protrusions 117.

Therefore, as the user grips the upper portions of the movable locking protrusions 117 and moves the movable locking protrusions 117 forward and rearward, the space distance between the fixed locking protrusions 116 and the movable locking protrusions 117 may be adjusted. Accordingly, the fixed frame unit 100 may be stably mounted to upper ends of the various display 2 with different thicknesses.

The fixed locking protrusions 116 may include a plurality of fixed locking protrusions 116 spaced apart from each other in a transversal direction based on the seated part 111. Then, the movable locking protrusions 117 may also include a plurality of movable locking protrusions 117 spaced apart from each other in the transversal direction based on the seated part 111. The guide slits 113 for the locking protrusions may include a plurality of guide slits 113 corresponding to the number and location of the plurality of movable locking protrusions 117.

As an example, the fixed locking protrusions 116 may include a pair of fixed locking protrusions 116 arranged in left and right of the bent part 112. Then, the movable locking protrusions 117 may include a pair of movable locking protrusions 117 respectively arranged in rear of the pair of fixed locking protrusions 116.

As the plurality of fixed locking protrusions 116 and the plurality of movable locking protrusions 117 are provided while being spaced apart from each other in the transversal direction, the fixed frame unit 100 may be further stably mounted to the display 2.

Meanwhile, the elevating guide 130 may be formed to enclose at least a part of the moving frame 200. Then, the elevating guide 130 may be mounted to the fixed frame 110 while enclosing at least a part of the moving frame 200 and may restrain the moving frame 200 to the fixed frame 110 so that the moving frame 200 may be raised and lowered.

In detail, the elevating guide 130 may be formed to have a predetermined transversal length, and opposite ends may protrude rearward. As an example, the elevating guide 130 may be formed in a '⊏'-shape.

The elevating guide 130 may be arranged at front of a pair of guide slits 220, which will be described below, of the moving frame 200 to cross between the guide slits. Then, the opposite ends of the elevating guide 130 protruding rearward may pass through the pair of guide slits 220 to be mounted to the bent part 112. Herein, the opposite ends of the elevating guide 130 may be mounted to the bent part 112 by fastening members such as screws and bolts.

Meanwhile, the fixed frame unit 100 may include a fixing part 140 selectively fixing the moving frame 200 at a desired height by a manipulation of a user.

The fixing part 140 may be provided such that the user may manipulate. The user can fix the moving frame 200 by manipulating the fixing part 140 while the moving frame 200 is located at the desired height of the user. Then, as the fixing part 140 is manipulated, a fixed state of the moving frame 200 may be removed.

As an example, the fixing part 140 may be applied as a pin structure in which the fixing part 140 passes through the elevating guide 130 from the front to rear of the elevating guide 130. Then, as the user manipulates the fixing part 140, the fixing part 140 passes through the elevating guide 130 and then inserted into a fixing part inserting holes 210, which will be described below, of the moving frame 200, and the height of the moving frame 200 may be fixed.

<The Moving Frame>

The moving frame 200 may be formed in a rectangular plate and be formed in a vertically long shape.

The moving frame 200 may have the pair of guide slits 220 through which the opposite ends of the elevating guide 130 passes.

The pair of guide slits 220 may be formed in the vertically long shape and be extended downward from locations adjacent to an upper end of the moving frame 200. Then, the pair of guide slits 220 may be extended to the middle of the length of the moving frame 200.

Then, the pair of guide slits 220 may be arranged to be transversally spaced apart from each other, and may be formed at left and right edges of the moving frame 200. The pair of guide slits 220 may be symmetrically arranged based on a center line of a transversal width of the moving frame 200.

The pair of guide slits 220 may form a moving space of the elevating guide 130 when the moving frame 200 is raised and lowered. Then, each of the pair of guide slits 220 has the closed upper and lower surfaces, so that the raised and lowered height of the moving frame 200 may be limited.

In other words, when the moving frame 200 is raised, the elevating guide 130 is relatively moved downward along the pair of guide slits 220. Then, as the elevating guide 130 and the lower surfaces of the pair of guide slits 220 are brought into contact with each other, raising of the moving frame 200 may be limited.

In the other hand, when the moving frame 200 is lowered, the elevating guide 130 is relatively moved upward along the pair of guide slits 220. Then, as the elevating guide 130 and the upper surfaces of the guide slits 220 are brought into contact with each other, lowering of the moving frame 200 may be limited.

The fixing part inserting holes 210 into which the fixing part 140 is inserted may be provided in the moving frame 200. The fixing part inserting holes 210 may include a plurality of fixing part inserting holes 210 spaced apart from each other in a vertical direction.

The plurality of fixing part inserting holes 210 may be formed in a region between the pair of guide slits 220, and be located on a path where the elevating guide 130 is relatively moved during raising of the moving frame 200. As an example, the plurality of fixing part inserting holes 210 may be arranged at the region between the pair of guide slits 220 and at the center portion of the transversal width of the moving frame 200. The plurality of fixing part inserting holes 210 may be arranged to be vertically spaced apart from each other at the center of the transversal width of the moving frame 200, and may be formed from an upper portion of the moving frame 200 to a middle portion thereof.

Meanwhile, the moving frame 200 may include an elevating unit mounting part 230 to which the elevating unit 300 is mounted to be raisable and lowerable and the elevating unit mounting part 230 provides a moving space of the elevating unit 300.

The elevating unit mounting part 230 may be formed such that a part of the moving frame 200 is cut out and opened from the front to the rear.

The elevating unit mounting part 230 may be formed on the center of the transversal width of the moving frame 200 and be formed in a vertically long shape. Herein, the elevating unit mounting part 230 may be located at a lower side of a region with the fixing part inserting holes 210 and be extended from the center of the length of the moving frame 200 to a lower portion thereof.

The elevating unit 300 may be partially inserted into the elevating unit mounting part 230 and be raised and lowered along the elevating unit mounting part 230.

The elevating unit mounting part 230 may have closed upper and lower surfaces, and may limit raising and lowering of the elevating unit 300.

When the elevating unit 300 is raised, the elevating unit 300 and the upper surface of the elevating unit mounting part 230 are brought into contact with each other, thus raising of the elevating unit 300 may be limited.

On the other hand, when the elevating unit 300 is lowered, the elevating unit 300 and the lower surface of the elevating unit mounting part 230 are brought into contact with each other, lowering of the elevating unit 300 may be limited.

Meanwhile, a stepped portion 240 may be formed on a rear surface of the moving frame 200 along a circumference of the elevating unit mounting part 230.

The stepped portion 240 may be formed to be recessed toward the front from the rear surface of the moving frame 200.

The stepped portion 240 may be formed in a vertically long shape at least left and right portions of the elevating unit mounting part 230. The stepped portion 240 may be formed along the entire circumference of the elevating unit mounting part 230.

In other words, by the stepped portion 240 a recessed space having a transversal width wider than a transversal width of the elevating unit mounting part 230 on the rear surface of the moving frame 200.

Figure 4:
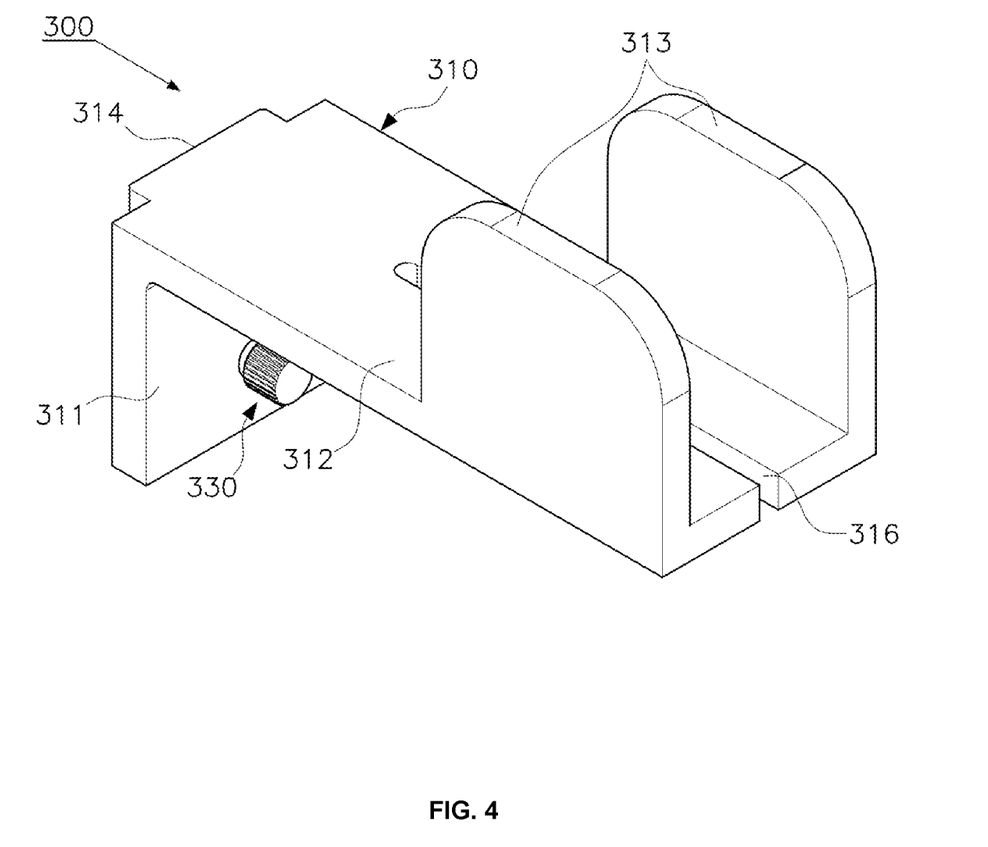
FIG. 4 is a perspective view showing an elevating unit according to the embodiment of the present disclosure.
Figure 5:
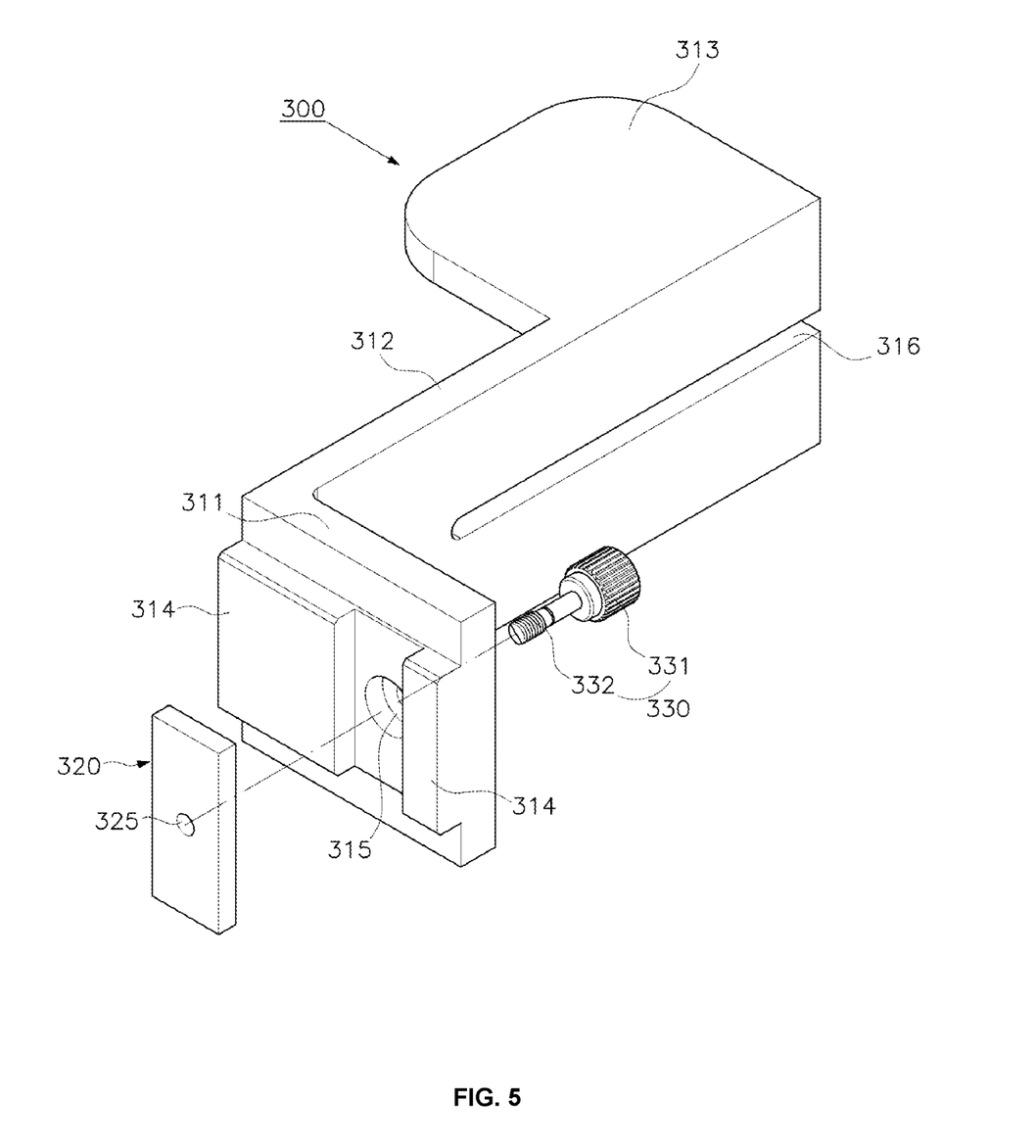
FIG. 5 is a perspective view, at another angle, showing the elevating unit according to the embodiment of the present disclosure.
Figure 6:
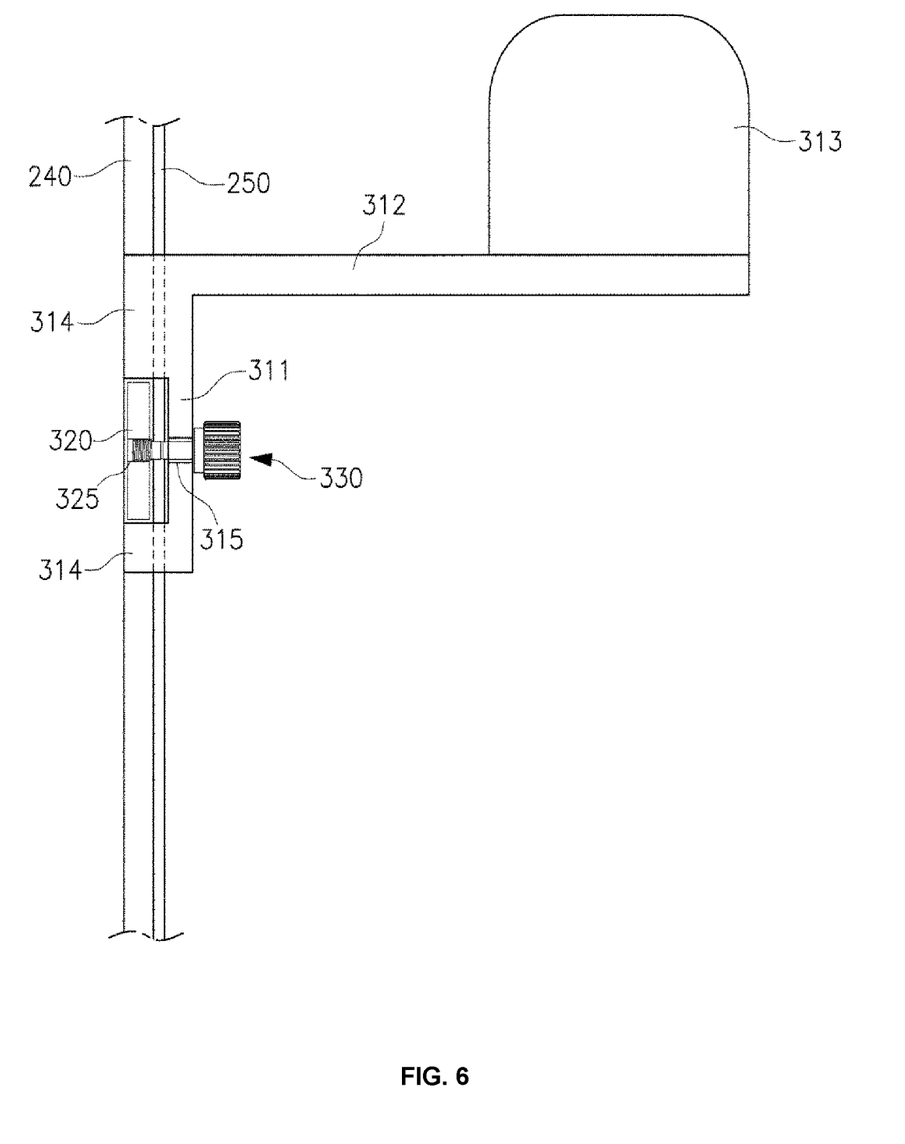
FIG. 6 is a sectional view showing a coupling structure between the elevating unit and an elevating unit mounting according to the embodiment of the present disclosure.

FIG. 4 is a perspective view showing an elevating unit according to the embodiment of the present disclosure. FIG. 5 is a perspective view, at another angle, showing the elevating unit according to the embodiment of the present disclosure. FIG. 6 is a sectional view showing a coupling structure between the elevating unit and an elevating unit mounting according to the embodiment of the present disclosure.

Hereinbelow, a structure of the elevating unit 300 according to the embodiment of the present disclosure will be described in detail.

<The Elevating Unit>

The elevating unit 300 may include a measuring instrument mounting member 310 to which the measuring instrument 3 is removably mounted, and a fixing unit mounting the measuring instrument mounting member 310 to the moving frame 200 in the raisable and lowerable manner.

The fixing unit may include a mounting member 320 and an elevation fixing part 330.

The measuring instrument mounting member 310 may include a front elevating part 311 having a predetermined vertical width and a predetermined transversal width, and a measuring instrument seating part 312 extended from the front elevating part 311.

The front elevating part 311 may have the predetermined vertical width and the predetermined transversal width and may be moved along the front surface of the moving frame 200.

The front elevating part 311 may be formed to have the transversal width wider than the front opening of the elevating unit mounting part 230, so that the opposite ends of the front elevating part 311 may be brought into contact with the front surface of the moving frame 200 located at the left and right of the elevating unit mounting part 230.

The measuring instrument seating part 312 may be extended forward from an upper end of the vertical portion, and may be formed to be perpendicular to the vertical portion.

The measuring instrument seating part 312 may have a predetermined longitudinal width and a predetermined transversal width, and may provide a seating surface of the measuring instrument 3.

The measuring instrument seating part 312 may be formed integrally with the front elevating part 311, and may be provided separately from the front elevating part 311 and coupled to the front elevating part 311.

The measuring instrument mounting member 310 may include measuring instrument fixing ribs 313 to prevent the measuring instrument 3 from being moved leftward and rightward.

The measuring instrument fixing ribs 313 may include a plurality of measuring instrument fixing ribs 313, and may include a pair of measuring instrument fixing ribs 313 transversally spaced apart from each other.

In detail, the pair of measuring instrument fixing ribs 313 may protrude upward from an upper surface of the measuring instrument seating part 312, and be respectively located on left and right ends of the measuring instrument seating part 312. Then, facing surfaces of the pair of measuring instrument fixing ribs 313 may be formed to have predetermined areas to stably fix the measuring instrument 3.

The measuring instrument 3 may be inserted into a space between the pair of measuring instrument fixing ribs 313, and the pair of measuring instrument fixing ribs 313 prevent the measuring instrument 3 from being moved leftward and rightward.

The pair of measuring instrument fixing ribs 313 may be made of an elastically deformable material so as to adjust the size of the space between the measuring instrument fixing ribs 313 corresponding to the size of the measuring instrument 3, and the pair of measuring instrument fixing ribs 313 may be provided to be movable in directions close to each other and away from each other.

Meanwhile, the measuring instrument mounting member 310 may have a fastening member insertion hole 316 through which a fastening member provided to fasten the measuring instrument 3 seated on the measuring instrument seating part 312 passes.

The fastening member insertion hole 316 may be formed in the measuring instrument seating part 312.

The fastening member insertion hole 316 may be formed at the center of a transversal width of the measuring instrument seating part 312 and be extended in a front to rear long shape.

The fastening member insertion hole 316 may be extended from a front end of the measuring instrument seating part 312 to a center portion of the front to rear length thereof, and be open toward the front.

The fastening member passing through the fastening member insertion hole 316 may be a screw or a bolt.

Generally, the measuring instrument 3 has a fastening portion receiving the fastening member, such as a screw and a bolt, provided to fix the measuring instrument 3 to a support such as a tripod.

As the fastening member insertion hole 316 is formed, the measuring instrument 3 located on the measuring instrument seating part 312 may be firmly fixed by using the fastening member. Herein, the fastening member has a first end passing through the fastening member insertion hole 316 and then inserted into the fastening portion provided in the measuring instrument 3.

Then, as the fastening member insertion hole 316 is extended in a longitudinally long shape, the fastening member is released and the measuring instrument 3 is moved longitudinally and then the fastening member is tightened, so that a mounting position of the measuring instrument 3 may be adjusted. Then, corresponding to the size and specifications of the measuring instrument 3, the measuring instrument 3 may be fixed to the measuring instrument mounting member 310 by using the fastening member.

Meanwhile, the measuring instrument mounting member 310 may include a protrusion 314 located an inner portion of the elevating unit mounting part 230 and moved along the elevating unit mounting part 230.

The protrusion 314 may protrude rearward from a rear surface of the front elevating part 311. Herein, the protrusion 314 may be formed to have a transversal width smaller than a transversal width of the front opening of the elevating unit mounting part 230, and be inserted through the front opening of the elevating unit mounting part 230.

Herein, the protrusion 314 may be formed to have the transversal width smaller than the transversal width of the front opening of the elevating unit mounting part 230 and be as close as possible to the elevating unit mounting part 230. The protrusion 314 may be adjacent to or be brought into contact with an inner surface of the elevating unit mounting part 230 so as to guide raising and lowering, so that the elevating unit 300 may be stably raised and lowered.

Then, the protrusion 314 may be formed to correspond to a longitudinal thickness of the elevating unit mounting part 230 or be formed in a smaller thickness than the elevating unit mounting part 230, so that the protrusion 314 may be prevented from protruding from the rear surface of the moving frame 200.

The protrusion 314 may include one protrusion 314 arranged on the rear surface of the front elevating part 311, and include a plurality of protrusions 314 vertically spaced apart from each other.

Hereinafter, as an example, it will be described that a pair of protrusions 314 is provided on the rear surface of the front elevating part 311 while being vertically spaced apart from each other.

Meanwhile, the mounting member 320 may be formed in a plate having a predetermined vertical width and a predetermined transversal width. The mounting member 320 may be arranged in rear of the front elevating part 311.

The mounting member 320 may be formed to have a transversal width wider than the transversal width of the elevating unit mounting part 230. Therefore, the mounting member 320 may be configured such that left and right ends thereof are brought into contact with the rear surface of the moving frame 200 outside the elevating unit mounting part 230.

The front elevating part 311 may be located at a front surface of the moving frame 200 and the mounting member 320 may be located at the rear surface of the moving frame 200. Then, as the transversal widths of the front elevating part 311 and the mounting member 320 are formed larger than the transversal width of the elevating unit mounting part 230, a part of the mounting member 320 located at the left and right side of the elevating unit mounting part 230 of the moving frame 200 may be located between the front elevating part 311 and the mounting member 320.

Herein, when the elevating unit 300 is raised, a region of the moving frame 200 passing along a space between the front elevating part 311 and the mounting member 320 may be defined as a rail part 250 (FIG. 2).

In other words, the rail part 250 may be defined as a part of the moving frame 200 located at the left and right of the elevating unit mounting part 230, and may be formed in a vertically long shape along the elevating unit mounting part 230.

When the protrusion 314 includes a pair of protrusions 314 vertically spaced apart from each other, the mounting member 320 may be formed to have a height enabling the mounting member 320 to be inserted into the space between the protrusions 314.

Then, the mounting member 320 may be formed to have a thickness corresponding to or thinner than a depth of the stepped portion 240, thereby being fully accommodated in the stepped portion 240. Therefore, the mounting member 320 may be prevented from protruding rearward from the moving frame 200.

Meanwhile, the elevation fixing part 330 may pass through a front surface of the front elevating part 311 and be coupled to the mounting member 320.

For achieving the above structure, the front elevating part 311 may have a first insertion hole 315 and the mounting member 320 may have a second insertion hole 325 at a location corresponding to the first insertion hole 315.

Herein, the first insertion hole 315 may be formed in a region of the front elevating part 311 corresponding to the elevating unit mounting part 230. Then, the second insertion hole 325 may be formed in a region of the mounting member 320 corresponding to the elevating unit mounting part 230.

The elevation fixing part 330 may be provided to adjust a space between the front elevating part 311 and the mounting member 320 by manipulation of the user.

As an example, the elevation fixing part 330 may include a manipulating portion 331 exposed to the front surface of the front elevating part 311 to allow the user to manipulate, and a screw portion 332 protruding rearward from a rear surface of the manipulating portion 331 and having screw threads on an outer circumferential surface thereof.

The manipulating portion 331 may be formed larger than the size of the first insertion hole 315 to be prevented from passing through the first insertion hole 315.

Then, the screw portion 332 may be formed in the size that may be inserted into both the first insertion hole 315 and the second insertion hole 325, and pass through the first insertion hole 315 and may be inserted into the second insertion hole 325.

Herein, the screw portion 332 may pass through both the first insertion hole 315 and the elevating unit mounting part 230 and be inserted into the second insertion hole 325.

Then, the second insertion hole 325 may have a screw thread that is operated in conjunction with the screw thread of the screw portion 332.

When the elevation fixing part 330 is rotated in a first direction, the screw threads are operated in conjunction with each other, so that the mounting member 320 may be moved along the screw portion 332 in a direction close to the front elevating part 311.

Therefore, a space between the front elevating part 311 and the mounting member 320 is narrowed, and the front elevating part 311 and the mounting member 320 is brought into close contact with and presses the rail part 250. Therefore, the elevating unit 300 may be fixed to the moving frame 200.

On the other hand, when the elevation fixing part 330 is rotated in a second direction, the screw threads are operated in conjunction with each other, so that the mounting member 320 may be moved along the screw portion 332 in a direction away from the front elevating part 311.

Therefore, the space between the front elevating part 311 and the mounting member 320 is increased, and a pressed state of the rail part 250 performed by the front elevating part 311 and the mounting member 320 is removed, so that a state of the elevating unit 300 fixed to the moving frame 200 may be removed. Therefore, the elevating unit 300 may be raised and lowered.

Then, as the rail part 250 is restrained between the front elevating part 311 and the mounting member 320, the elevating unit 300 may be mounted to the moving frame 200 in the raisable and lowerable manner. When the elevating unit 300 is raised and lowered, both the front elevating part 311 and the mounting member 320 are moved upward and downward along the rail part 250, thereby guiding raised and lowered movements of the elevating unit 300.

Meanwhile, the elevating unit 300 may be divided into the elevating part and the measuring instrument mounting part according to functions thereof.

The elevating part may be defined as a part where the elevating unit 300 is mounted to the moving frame 200 in the raisable and lowerable manner. In this case, the elevating part may include the front elevating part 311, the protrusion 314, the mounting member 320, and the elevation fixing part 330.

Then, the measuring instrument mounting part may be a part to which the measuring instrument 3 is mounted. In this case, the elevating part may include the measuring instrument seating part 312 and the measuring instrument fixing ribs 313.

Figure 7:
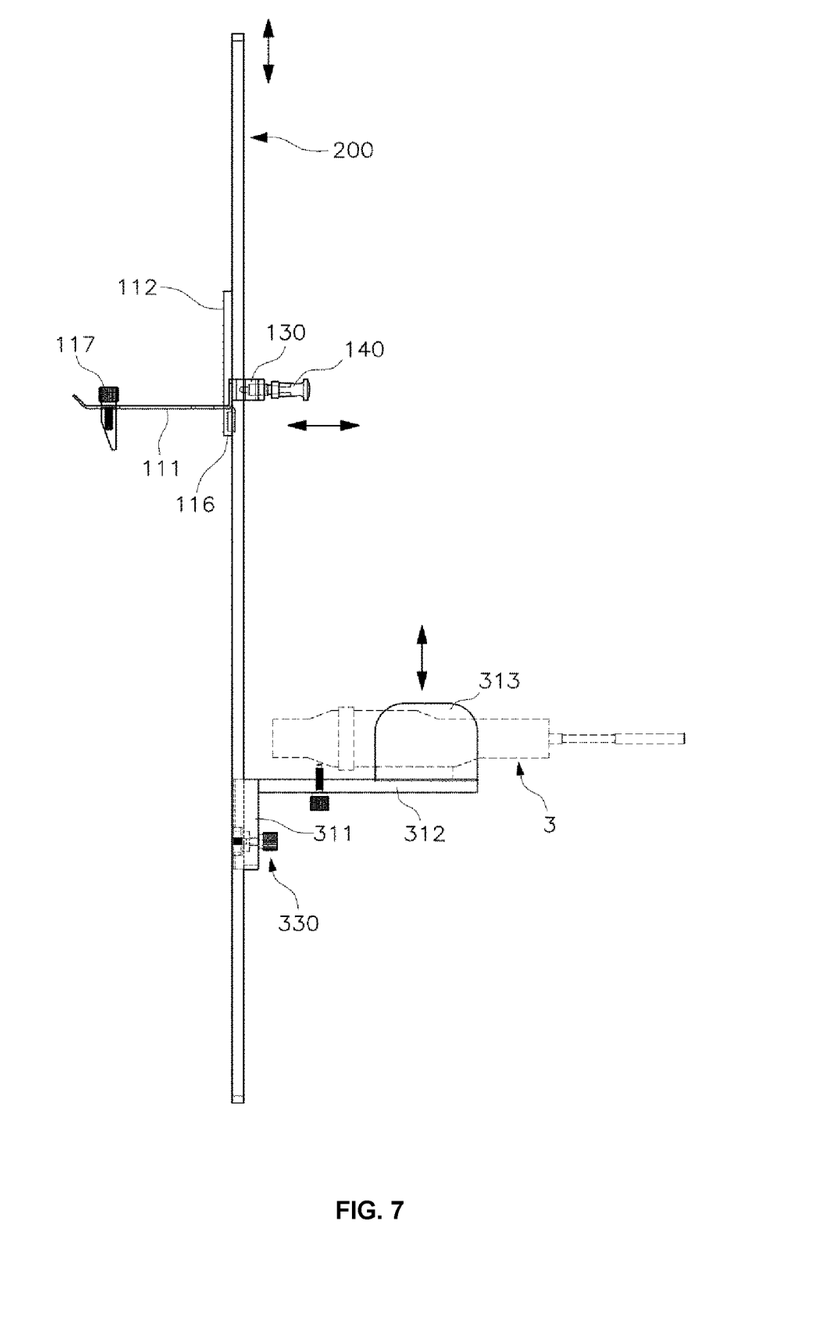
FIG. 7 is a front view showing the fixing device according to the embodiment of the present disclosure.
Figure 8:
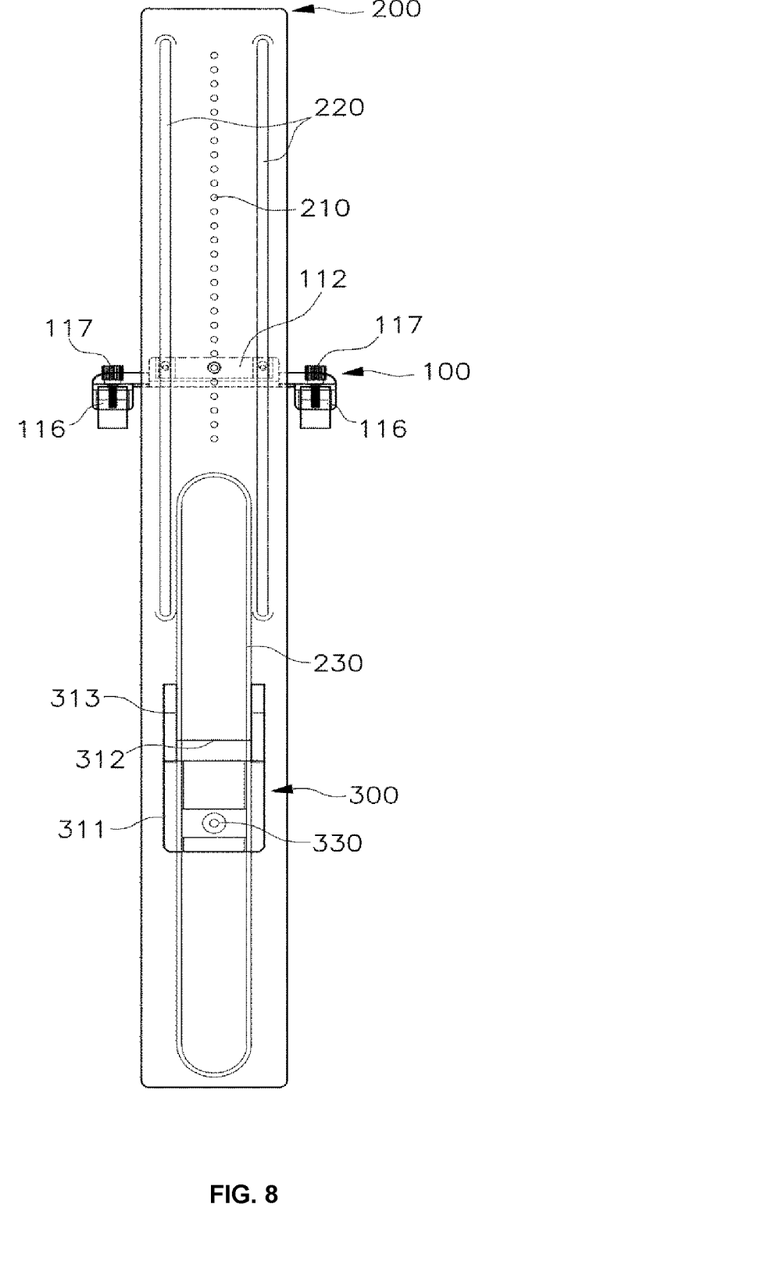
FIG. 8 is a side view showing the fixing device according to the embodiment of the present disclosure.

FIG. 7 is a front view showing the fixing device according to the embodiment of the present disclosure. FIG. 8 is a side view showing the fixing device according to the embodiment of the present disclosure.

Hereinbelow, raising and lowering movement of the fixing device will be described in detail with reference to the accompanying drawings.

While the fixed frame unit 100 is locked to the upper end of the display 2, the user can draw the fixing part 140 forward for raising and lowering the moving frame 200.

When the fixing part 140 is drawn forward and the fixing part 140 is separated from the fixing part inserting holes 210 of the moving frame 200, the moving frame 200 may be in a raisable and lowerable state against the fixed frame unit 100.

When the moving frame 200 is raised and lowered, the opposite ends of the elevating guide 130 that are located in the pair of guide slits 220 may be moved along the pair of guide slits 220.

Herein, while the elevating guide 130 surrounds the region between the pair of guide slits 220 of the moving frame 200 at the front of the moving frame 200, the opposite ends of the elevating guide 130 pass through the pair of guide slits 220. Therefore, the moving frame 200 may be restrained to the fixed frame unit 100 in the raisable and lowerable manner, and may be raised and lowered to be limited in raised and lowered heights.

When the moving frame 200 is raised to the maximum, the closed upper surfaces of the pair of guide slits 220 and the elevating guide 130 are brought into contact with each other, so that raising of the moving frame 200 may be limited.

Furthermore, the moving frame 200 is lowered to the maximum, the closed lower surfaces of the pair of guide slits 220 and the elevating guide 130 are brought into contact with each other, lowering of the moving frame 200 may be limited.

While the user locates the moving frame 200 to a desired height, the fixing part 140 is inserted into one of the fixing part inserting holes 210 located to correspond to a position of the elevating guide 130, so that the height of the moving frame 200 may be fixed.

The user can locate the elevating unit mounting part 230 of the moving frame 200 in an inspection region of the display 2 by adjusting the height of the moving frame 200.

Meanwhile, the measuring instrument 3 is mounted to the elevating unit 300 such that an inspecting part thereof faces the display 2 while passing through the elevating unit mounting part 230. In other words, the measuring instrument 3 may be mounted to the elevating unit 300 such that the inspecting part thereof faces rearward.

Herein, in order to direct the inspecting part of the measuring instrument 3 toward the center of the elevating unit mounting part 230, the measuring instrument seating part 312 may be arranged in line with the elevating unit mounting part 230 at the front of the elevating unit mounting part 230. Then, the measuring instrument fixing ribs 313 may be symmetrically arranged on the left and right with respect to a line perpendicularly passing through the center of the transversal width of the elevating unit mounting part 230.

Meanwhile, the elevating unit 300 restrains the rail part 250 between the front elevating part 311 and the mounting member 320, as the transversal width of the front elevating part 311 and the transversal width of the mounting member 320 are formed wider than the transversal width of the elevating unit mounting part 230, the elevating unit 300 may be restrained to the moving frame while being raisable and lowerable.

Furthermore, the space between the front elevating part 311 and the mounting member 320 is adjusted by manipulation of the elevation fixing part 330, the elevating unit 300 may be selectively fixed to the rail part 250.

The user can rotate the elevation fixing part 330 in the first direction to remove the state of the elevating unit 300 fixed to the moving frame 200.

When the elevation fixing part 330 is rotated in the first direction, the space between the front elevating part 311 of the measuring instrument mounting member 310 and the mounting member 320 is increased, and the rail part 250 is released from the pressed state, so that the elevating unit 300 may be in the raisable and lowerable state.

When the elevating unit 300 is in the raisable and lowerable state, the user can adjust the height of the elevating unit 300 to allow the inspecting part of the measuring instrument 3 to face a precise inspection position of the display 2.

Then, the user can rotate the elevation fixing part 330 in the second direction to fix the height of the elevating unit 300.

When the elevation fixing part 330 is rotated in the second direction, the space between the front elevating part 311 and the mounting member 320 is reduced, and the rail part 250 is in the pressed state to fix the elevating unit 300, so that the elevating unit 300 may be prevented from being raised and lowered.

While the elevating unit 300 is fixed, the measuring instrument 3 may face the inspection position of the display 2 and be stably maintained in the position without movement. Therefore, stable inspection for the display 2 may be performed using the measuring instrument 3.

When the elevating unit 300 is raised and lowered, both the front elevating part 311 and the mounting member 320 are moved upward and downward along the rail part, thereby guiding raised and lowered movements of the elevating unit 300.

Then, the protrusion 314 may be located in the elevating unit mounting part 230 and moved along the elevating unit mounting part 230, and may stably guide the raised and lowered movement of the elevating unit 300.

When the elevating unit 300 is raised and lowered, as the upper and lower surfaces of the elevating unit mounting part 230 are closed, contact between the elevating unit 300 and the closed upper surface of the elevating unit mounting part 230 may limit the raised movement of the elevating unit 300. Furthermore, contact between the closed lower surface of the elevating unit mounting part 230 and the elevating unit 300 may limit the lowered movement of the elevating unit 300.

Meanwhile, as both the protrusion 314 and the mounting member 320 are provided with thicknesses not to protrude rearward from the rear surface of the moving frame 200, a portion protruding toward the front surface of the display 2 from the rear surface of the moving frame 200 may be prevented. Therefore, a problem in that the part protruding from the rear surface of the moving frame 200 damages the display 2 may be prevented, and stable inspection for the display 2 using the fixing device 1 may be performed.

What is claimed is:

1. A device for fixing a measuring instrument for inspecting a display, the device comprising:

a fixed frame unit configured to be removably mounted to an upper end of the display;

a moving frame extended in vertical directions and configured to be movably mounted to the fixed frame unit in a raisable and lowerable manner; and an elevating unit configured to be mounted to the moving frame in the raisable and lowerable manner and configured to removably hold the measuring instrument for inspecting the display.

2. The device of claim 1, wherein the moving frame has a pair of guide slits that penetrate the moving frame in shapes spaced from each other in a transversal direction and are extended the vertical directions, and the fixed frame unit comprises:

a fixed frame configured to be mounted to the upper end of the display; and an elevating guide arranged at front of the pair of guide slits of the moving frame while crossing between the guide slits, the elevating guide having opposite ends protruding rearward and passing through the pair of guide slits and fixed to the fixed frame, thereby restraining the moving frame in the raisable and lowerable manner.

3. The device of claim 2, wherein the moving frame has a plurality of fixing part inserting holes arranged at an region between the pair of guide slits with vertical intervals, and the fixed frame unit comprises a fixing part, wherein the fixing part is configured to be movable in a direction insertable in and ejectable from one of the fixing part inserting holes located at a height corresponding to a height of the elevating guide, and to selectively fix the moving frame at a user-desired height while being inserted into the fixing part inserting hole located at the corresponding height as the user manipulates the fixing part.

4. The device of claim 1, wherein the moving frame has an elevating unit mounting part extended in the vertical directions, the elevating unit mounting part penetrating the moving frame, and the elevating unit comprises:

an elevating part provided at the moving frame and configured to be movable in a raisable and lowerable manner along the elevating unit mounting part; and a measuring instrument mounting part protruding forward from the elevating part and configured to hold the measuring instrument, wherein the elevating unit mounting part is configured to expose the display toward the measuring instrument.

5. The device of claim 4, wherein the measuring instrument mounting part comprises:

a measuring instrument seating part protruding forward from an upper end of the elevating part and providing a seating surface of the measuring instrument; and a pair of measuring instrument fixing ribs protruding from an upper surface of the measuring instrument seating part so as to surround opposite sides of the measuring instrument and arranged in the transversal direction with an interval.

* * * * *